(12) United States Patent
Sikes et al.

(10) Patent No.: US 9,321,663 B2
(45) Date of Patent: Apr. 26, 2016

(54) FLOTATION AND SEPARATION OF FLOCCULATED OILS AND SOLIDS FROM WASTE WATERS

(75) Inventors: C. Steven Sikes, Eugene, OR (US); T. Daniel Sikes, Eugene, OR (US); Mark A. Hochwalt, Chesterfield, MO (US)

(73) Assignee: Aquero Company, LLC, Eugene, OR (US)

( * ) Notice: Subject to any disclaimer, the term of this patent is extended or adjusted under 35 U.S.C. 154(b) by 1204 days.

(21) Appl. No.: 13/055,432

(22) PCT Filed: Jul. 23, 2009

(86) PCT No.: PCT/US2009/051589
§ 371 (c)(1),
(2), (4) Date: Jul. 25, 2011

(87) PCT Pub. No.: WO2010/011867
PCT Pub. Date: Jan. 28, 2010

(65) Prior Publication Data
US 2011/0272362 A1 Nov. 10, 2011

Related U.S. Application Data

(60) Provisional application No. 61/082,910, filed on Jul. 23, 2008.

(51) Int. Cl.
*C02F 1/24* (2006.01)
*C02F 1/56* (2006.01)
(Continued)

(52) U.S. Cl.
CPC ... *C02F 1/56* (2013.01); *C02F 1/66* (2013.01); *C02F 1/24* (2013.01); *C02F 2101/32* (2013.01); *C02F 2101/325* (2013.01);
(Continued)

(58) Field of Classification Search
None
See application file for complete search history.

(56) References Cited

U.S. PATENT DOCUMENTS 3,502,575 A    3/1970  Hepp
3,541,009 A    11/1970 Arendt
(Continued)

FOREIGN PATENT DOCUMENTS

CA    2204087    11/1997
JP    2001129310  5/2001
(Continued)

OTHER PUBLICATIONS

Hans Burkert, Jürgen Hartmann: "Flocculants" In: Ullmann's Encyclopedia of Industrial Chemistry (Jun. 2000), pp. 1-6.
(Continued)

*Primary Examiner* — Thomas M Lithgow
(74) *Attorney, Agent, or Firm* — Remenick PLLC

(57) ABSTRACT

Oily and/or solids-containing water is clarified by chemical treatment to form flocculated and agglomerated solid phases and a clear water phase. In the clarification process, microbubbles of air or other gas are introduced at atmospheric pressure, via an eductor or other suitable device, together with a flocculant. During the subsequent formation of flocs and their agglomeration into larger masses, microbubbles become entrained within and adhered to the solid flocculated materials. The resulting masses are very buoyant and easily separated from the water via a variety of approaches that include skimming, decanting, filtration, and screening. This process results in a solids phase that may be disposed of as waste, if desired, and a highly clarified water phase.

13 Claims, 3 Drawing Sheets

Flotation Simulator Diagram

(51) Int. Cl.
*C02F 1/66* (2006.01)
*C02F 101/32* (2006.01)
*C02F 103/10* (2006.01)
*C02F 103/32* (2006.01)
*C02F 103/36* (2006.01)

(52) U.S. Cl.
CPC ........ *C02F 2103/10* (2013.01); *C02F 2103/32* (2013.01); *C02F 2103/365* (2013.01)

(56) References Cited

U.S. PATENT DOCUMENTS

| | | |
|---|---|---|
| 3,633,310 A | 1/1972 | Sandiford |
| 3,705,467 A | 12/1972 | McKnight |
| 3,873,487 A | 3/1975 | Minato et al. |
| 3,875,054 A | 4/1975 | Hunt et al. |
| 3,932,282 A | 1/1976 | Ettelt |
| 3,981,100 A | 9/1976 | Weaver et al. |
| 4,066,495 A | 1/1978 | Voigt et al. |
| 4,071,447 A | 1/1978 | Ramirez |
| 4,105,824 A | 8/1978 | Monte |
| 4,120,815 A | 10/1978 | Raman |
| 4,214,987 A * | 7/1980 | Clemens ............... 210/707 |
| 4,330,407 A | 5/1982 | Shermer et al. |
| 4,330,409 A | 5/1982 | Yong et al. |
| 4,382,853 A | 5/1983 | McCoy |
| 4,405,015 A | 9/1983 | McCoy et al. |
| 4,457,371 A | 7/1984 | McCoy et al. |
| 4,600,501 A | 7/1986 | Poirier |
| 4,673,511 A | 6/1987 | Richardson et al. |
| 4,699,951 A | 10/1987 | Allenson et al. |
| 4,705,825 A | 11/1987 | Symes et al. |
| 4,734,205 A | 3/1988 | Jacques et al. |
| 4,738,784 A | 4/1988 | Sugihara |
| 4,741,835 A | 5/1988 | Jacques et al. |
| 4,797,145 A | 1/1989 | Wallace |
| 5,128,046 A | 7/1992 | Marble et al. |
| 5,178,774 A | 1/1993 | Payne et al. |
| 5,330,656 A | 7/1994 | Hassick |
| 5,451,328 A | 9/1995 | Bottero et al. |
| 5,593,947 A | 1/1997 | Kinnersley et al. |
| 5,659,998 A | 8/1997 | Salestrom |
| 5,693,222 A | 12/1997 | Galvan et al. |
| 5,730,882 A | 3/1998 | Gallup et al. |
| 5,861,356 A | 1/1999 | Koskan et al. |
| 5,928,474 A | 7/1999 | Moffett |
| 6,034,204 A | 3/2000 | Mohr et al. |
| 6,042,732 A | 3/2000 | Jankowski et al. |
| 6,048,438 A | 4/2000 | Rosencrance et al. |
| 6,214,786 B1 | 4/2001 | Randall et al. |
| 6,217,778 B1 | 4/2001 | Shing et al. |
| 6,238,521 B1 | 5/2001 | Shing et al. |
| 6,307,013 B1 | 10/2001 | Chivers |
| 6,337,023 B1 | 1/2002 | Broussard, Sr. |
| 6,620,317 B2 | 9/2003 | Alviti |
| 6,699,363 B2 | 3/2004 | Moffett |
| 6,803,107 B2 | 10/2004 | Mitchell et al. |
| 6,825,313 B2 | 11/2004 | Sikes |
| 6,884,347 B1 | 4/2005 | Krieger |
| 6,889,471 B2 | 5/2005 | Arnold |
| 6,960,294 B2 | 11/2005 | Arnaud |
| 6,969,750 B2 | 11/2005 | Tanaka et al. |
| 7,077,201 B2 | 7/2006 | Heins |
| 7,160,470 B2 * | 1/2007 | Davis et al. .......... 210/708 |
| 7,183,336 B2 | 2/2007 | Berlin et al. |
| 7,497,954 B2 | 3/2009 | Ivan et al. |
| 7,595,002 B2 | 9/2009 | Sikes et al. |
| 7,595,007 B2 * | 9/2009 | Sikes et al. .......... 252/180 |
| 7,987,297 B2 | 7/2011 | Schwabe et al. |
| 2002/0058786 A1 | 5/2002 | Chivers |
| 2002/0121484 A1 | 9/2002 | Arai |
| 2005/0194323 A1 * | 9/2005 | Ruth et al. .......... 210/723 |
| 2008/0058576 A1 | 3/2008 | Shafer |
| 2009/0127205 A1 | 5/2009 | Sikes |
| 2010/0038314 A1 | 2/2010 | Vion |
| 2010/0126926 A1 | 5/2010 | Wiemers |
| 2011/0272362 A1 | 11/2011 | Sikes et al. |
| 2014/0166586 A1 | 6/2014 | Sikes |
| 2015/0259231 A1 | 9/2015 | Webber et al. |

FOREIGN PATENT DOCUMENTS

| | | | |
|---|---|---|---|
| JP | 2007-209890 | | 8/2007 |
| JP | 2007-209890 A | * | 8/2007 |
| WO | 9821271 | | 5/1998 |
| WO | 2005054300 | | 6/2005 |
| WO | 2007047481 | | 4/2007 |
| WO | 2010011867 | | 1/2010 |
| WO | 2012148397 | | 11/2012 |
| WO | 2014018452 | | 1/2014 |

OTHER PUBLICATIONS

American Society for Testing and Materials, Method D 7066-04, 2004.
United States Environmental Protection Agency (EPA) Method 1664, Revision A, 1999. N-Hexane extractable material (HEM; oil and grease) and silica gel treated n-hexane extractable material (SGT-HEM; non-polar material) by extraction and gravimetry. Cincinnati, Ohio: U.S. EPA National Service Center for Environmental Publications, Doc. No. EPA-821-R-98-002, Feb. 1999, 23 pages.
United States Environmental Protection Agency (EPA) Method 9071A, Revision 1, 1994, Oil and grease extraction method for sludge and sediment samples. U.S. EPA, Sep. 1994, 1-7.
Orts et al., "Biopolymer additives to reduce erosion-induced soil losses during irrigation" Industrial Cops and Products 11 (2000) 19-29.
Orts et al., ACS Symposium Series (2001), 786 (Biopolymers form Polysaccharides and Agroproteins), 102-116.
Lentz et al., Soil Science Society of America Journal, 56(6):P1926-1932 (1992).
Hart, "Chemical Removal of Organic Foulants form Produced Water Recycled as Steam" SPE International Thermal Operations and Heavy Oil Symposium and International Horizonal Well Technology Conference (2002).
Wang et al., "Effects of Chemical Application on Antifouling in Steam—Assisted Gravity Drainage Operations" Energy & Fuels, vol. 19, pp. 1425-1429 (2005).
International Search Report and Written Opinion dated Jan. 28, 2010 (WO 2010/011867).
International Preliminary Report on Patentability dated Jan. 23, 2011 (WO 2010/011867).
International Search Report and Written Opinion dated Nov. 1, 2012 (WO 2012/148397).
International Search Report and Written Opinion dated Dec. 16, 2013 (WO 2014/018452).
Office Action issued Jul. 13, 2015 (CA 2,731,608).
Office Action issued Jan. 28, 2015 (AU 2009273946).
Office Action issued Jun. 14, 2012 (EP 09790780.2).
Office Action issued Aug. 18, 2014 (EP 09790780.2).
Office Action Issued Apr. 14, 2008 (CA 2,595,723).
Office Action Issued Jun. 18, 2010 (CA 2,643,137).
Office Action Issued Apr. 1, 2011 (CA 2,643,137).
Office Action Issued Feb. 28, 2012 (CA 2,643,137).
Office Action issued Jun. 26, 2009 (EP 06825932.4).
Office Action issued Jul. 12, 2010 (EP 06825932.4).
Office Action issued Nov. 10, 2011 (EP 06825932.4).
Office Action issued Feb. 6, 2014 (EP 06825932.4).
Office Action issued Nov. 18, 2012 (EP 11172873.9).
Office Action issued Jul. 9, 2015 (EP 11172873.9).
Restriction Requirement issued Oct. 23, 2008 (U.S. Pat. No. 7,595,007).
Office Action issued Jan. 9, 2009 (U.S. Pat. No. 7,595,007).
Office Action Issued Nov. 14, 2008 (U.S. Pat. No. 7,595,002).
Restriction Requirement issued Mar. 11, 2011 (US 2009/0127205).
Office Action issued May 17, 2011 (US 2009/0127205).
Office Action issued Nov. 17, 2011 (US 2009/0127205).

(56) References Cited

OTHER PUBLICATIONS

Office Action issued May 21, 2012 (US 2009/0127205).
Office Action issued Aug. 29, 2012 (US 2009/0127205).
Office Action issued Mar. 24, 2014 (US 2009/0127205).
Office Action issued Jan. 8, 2015 (US 2009/0127205).
Notice of Allowance issued Jun. 2, 2009 (U.S. Pat. No. 7,595,007).
Notice of Allowance issued Jun. 1, 2009 (U.S. Pat. No. 7,595,002).

* cited by examiner

FLOTATION AND SEPARATION OF FLOCCULATED OILS AND SOLIDS FROM WASTE WATERS

This application is a U.S. National Stage of International Patent Application No. PCT/US2009/051589, filed Jul. 23, 2009, which claims priority to U.S. provisional patent application No. 61/082,910, filed Jul. 23, 2008, each of which is hereby incorporated by reference in its entirety.

FIELD OF THE INVENTION

The invention is directed towards clarification of process waste waters via flotation of oily solids and other solids, by simultaneous flocculation, agglomeration, and incorporation of air bubbles into the forming solid materials. The solids are subsequently separated from the clarified water, e.g. by skimming, decanting, filtration, screening, centrifugation, or a combination of these operations.

REFERENCES

Arnaud, Johnny. Nov. 1, 2005. Apparatus for the separation of solids from liquids by dissolved gas floatation. U.S. Pat. No. 6,960,294.

American Society for Testing and Materials, Method D 7066-04, 2004. Standard test method for dimer/trimer of chlorotrifluoroethylene (S-316) recoverable oil and grease and nonpolar material by infrared determination.

Ettelt, Gregory A. Jan. 13, 1976. Dissolved Air Floatation System. U.S. Pat. No. 3,932,282.

Galvan, A. G. and R. Menon. Dec. 2, 1997. Apparatus and method for improved high-efficiency dissolved air flotation fluid processing. U.S. Pat. No. 5,693,222.

Galvan, A. G. and R. Menon. Apr. 30, 1997. Apparatus and method for improved high-efficiency dissolved air flotation fluid processing. Canadian Patent No. 2204087.

Sikes, C. Steven. Apr. 26, 2007. Amino Acid, Carbohydrate and Acrylamide Polymers Useful as Flocculants in Agricultural and Industrial Settings. PCT Pubn. No. WO 07/047481.

United States Environmental Protection Agency (EPA) Method 1664, Revision A, 1999. N-Hexane extractable material (HEM; oil and grease) and silica gel treated n-hexane extractable material (SGT-HEM; non-polar material) by extraction and gravimetry. Cincinnati, Ohio: U.S. EPA National Service Center for Environmental Publications, Doc. No. EPA-821-R-98-002, February 1999, 23 pages.

United States Environmental Protection Agency (EPA) Method 9071A, Revision 1, 1994. Oil and grease extraction method for sludge and sediment samples. U.S. EPA, September 1994, 1-7.

BACKGROUND

Wastewater generated in industrial, agricultural, and other processes often contains unwanted oily droplets, mineral particulates, cellular debris, crop residuals, and other solid and semi-solid matter. Before the water is re-used, recycled to the process, or released to the environment, it is preferably restored to a solids-free, clear condition. Prominent examples include removal of oil and oily solids in water used in oil recovery operations. Similarly, soil components and biological remnants may occur in the water used in recovery and handling of crops and in food processing.

In the case of oil recovery operations, water is used for a variety of reasons. For example, it may be injected as superheated steam into the formation to facilitate liquefaction of the oily deposits at depth followed by movement of the pressurized, oily aqueous stream to the surface. Here, the oil is separated from the water. Typical ratios of water to oil in such operations range around 2 to 3.0. That is, there often results approximately 2 to 3 barrels of water containing oily residuals per barrel of oil that is recovered.

In principal, the oil may be separated from the water via straightforward separation techniques, such as flotation and skimming, that take advantage of the differences in the densities of oil and water. However, in practice, the leftover water stream after surface skimming or raking, decanting, or preferential draining is often dark and oily, due to the presence of stable emulsions and suspensions of oil and oily solids in the water.

These components are thought to be ionically dispersed in the water as oily micelles having outwardly facing anionic groups such as carboxylates and, to a lesser extent, sulfates, sulfonates, phosphates, and phosphonates that are covalently linked to aliphatic, cyclic, and heterocyclic hydrocarbon moieties of complex and heterogeneous composition. In addition to the oily droplets emulsified in the water column, there can be significant components of mineral residuals such as micron-scale particles of sand and clays. Total suspended solids and oils can range upwards of 30% by weight and higher. Even in the range of 1% by weight or less, they can render the water unusable without further clarification and separation steps.

Ideally, in zero discharge approaches to oil recovery such as steam-assisted gravity drainage (SAGD) or cyclic steam stimulation (CSS), the water needs to be clarified to acceptable levels so that it can be recycled to the steam generators without fouling and clogging the boilers or downstream process equipment such as organic removal filters and ion exchangers. In larger-scale, open-mining operations, ultimately it is desirable to return the clarified and cleansed water to the environment, typically a river, from which it originated.

As exemplified in SAGD and CSS operations, the oil is recovered from an aqueous process stream that is brought to the surface from the depths of the formation, still superheated and under pressure. This process water typically involves volumes of 1000's of gallons per minute flowing at rates of 8 feet per second or higher. The flow often occurs through pipes of 10 inches diameter or higher throughout many of the steps of the process. However, the stream is slowed down at certain steps that do not tolerate rapid flow and high shear conditions. For example, shortly after reaching the surface, the stream is directed into very large vessels such as high-temperature separators where the bulk of the oil and water naturally and largely separate mainly based on their densities, invariably with some chemical enhancements such as added de-emulsifiers to promote both rate and degree of separation. The oil is removed and sent to pipelines and tankers for transport to upgraders and refineries for further processing.

Removal of the bulk of recovered oil leaves a reverse emulsion of residual oil and oily solids in water, termed produced water. Roughly three barrels of oily and bituminous-containing water are typically produced per barrel of oil. The solids content of produced water at this stage is typically 1-2%, and at later stages (e.g. slop streams or tailings ponds) it can range from 1% to 60% solids, often in the range of 30% to 60% solids. Produced waters from surface mining can also have high solids contents, e.g. in the 30% range.

The produced water obtained after removal of the bulk of recovered oil is cooled via heat exchangers to a temperature in the range of 90° C., so that it can be handled more readily in the subsequent downstream process steps that include addition of water clarification chemicals. Because of the high oily and bituminous content of the produced waters, and the elevated temperatures involved, it has been challenging to design effective water-treatment protocols that clarify the water and provide good separation of the aqueous and petrochemical phases.

A coagulant is first added to the produced water to disrupt the anionic dispersion and promote coalescence of oily droplets and solids into small particulates. At this point, in SAGD operations, the produced water stream so treated is transferred, typically at high velocity (e.g. about 8 feet/second), into large skim tanks with low velocity and high residence times (typically several hours). Floating oily solids are removed by skimming.

The partially clarified produced water may then be transferred into dissolved gas flotation devices, which generate microbubbles by introducing a solution prepared by dissolving a gas at high pressure and releasing the pressure such that the gas is released from solution. The bubbles so generated are intended to stick to the oily particulates and make them float, and the resulting float is decanted so that the produced water stream can be further clarified.

The stream is then directed through organic removal filters so that any residual potential foulants will not reach the final step of ion exchange prior to return of the water to the steam generator and re-injection into the well. The ion exchange membranes and devices do not tolerate oil and oily residuals and can be easily ruined by an input of improperly de-oiled water, either suddenly or gradually. This results in downtime, very costly both in lost production and replacement of ion exchangers as well as other components of the de-oiling line.

Conventional treatments of oily produced water streams, as described above, are often ineffective, resulting in only partially clarified water. Even if the treatment does result in coalescence of oily solids and partitioning of oily and aqueous phases, the subsequent attempts at removal of residual oil and oily solids are often inefficient.

The conventional processing steps for clarification of produced water are designed to allow skimming of the oil and oily solids from the upper levels and surface of separators, skim tanks, and flotation devices. However, the density of the oily solids and even the oil itself is often very close to that of the water itself. Consequently, the materials that are targeted for removal (the oil and oily solids) either do not float in the first place, or they become readily dispersed throughout the water column, even with only minimal turbulence.

In addition, the microbubbles that are introduced in the flotation devices for the purpose of attachment to the oily solids, as described above, either do not attach or are too poorly attached to survive the turbulent conditions of the flotation devices, making the flotation step unacceptably inefficient. Hence, the downstream produced water stream very often is overly oily and contaminated with particulates, resulting invariably in costly repairs and downtime.

SUMMARY

As described further below, the disclosed process for clarifying a downstream waste process water containing suspended and/or emulsified oils and/or solids comprises a step in which a polycationic coagulant is added to the process stream. The oily droplets and/or suspended solids so treated coalesce into oily particulates of micron-scale. Next, a flocculant is introduced, along with gas bubbles, e.g. air bubbles, allowing both air and flocculant to be drawn into the process stream. The flocculant acts to bind together the coagulated oily droplets and solids, typically within the first minute, into flocs which may have dimensions in the range of 100 microns or more. These flocs often agglomerate into millimeter- or centimeter-sized masses within a matter of minutes. Simultaneous with these reactions, microbubbles of air or other gas phase become incorporated within the agglomerates, both during the initial flocculation and the following agglomeration of the oily solids, rendering the overall solid phase plus bubbles very buoyant for later separation by skimming, decanting, or other separation methods.

Thus, in one aspect, the invention provides a method of clarifying a downstream waste process water containing suspended and/or emulsified solids, particularly wastewater obtained from a mining operation and comprising a hydrocarbon- and bitumen-containing oil-in-water emulsion. The method comprises:

(a) adding a polycationic coagulant to the process water;

(b) subsequently adding a flocculant, comprising an acrylamide copolymer, preferably having a molecular weight of at least 4 million Daltons, to the process water, and simultaneously introducing gaseous microbubbles into the process water, whereby, during subsequent formation and agglomeration of flocs of oily solid and semisolid matter, the microbubbles become entrained within and adhere to the flocs; and (c) separating a phase of flocculated oily solid and semisolid matter from a clarified aqueous phase.

The separating of step (c) may be done, for example, by skimming or decanting flocculated matter from a top surface of the clarified aqueous phase, or by screening or filtration of flocculated matter from the clarified aqueous phase. The final mixture containing these distinct phases may also be centrifuged to facilitate separation. Separation may use any combination of these or other techniques.

In one embodiment of the process, the pH of the process water is adjusted to about 2-4 prior to the addition of the coagulant. In a further embodiment, a short incubation period, e.g. about 5-30 seconds, follows the addition of the polycationic coagulant (step (a)). The longer incubation times are indicated when an anionic flocculant composition is to be used, while even shorter times can typically be used when a cationic flocculant is employed The gaseous microbubbles of step (b) are introduced simultaneously with the flocculant, and they may be introduced by aspiration or eduction (i.e. an atmospheric or near-atmospheric pressure system). For example, the flocculant and gas bubble stream may be introduced into the atmospheric opening of an eductor. The gas bubbles may also be released from a pressurized solution of dissolved gas, by reducing the pressure to atmospheric or near-atmospheric, as long as this is done prior to introducing the gas to the process water, together with the flocculant.

The acrylamide copolymer may be an anionic acrylamide copolymer, such as an acrylamide/acrylate copolymer; or, in other embodiments, a cationic acrylamide copolymer, such as an acrylamide/allyl trialkyl ammonium copolymer or an acrylamide/diallyl dialkyl ammonium copolymer. Preferably, the copolymer has a mole % acrylamide of at least 50%. The acrylamide copolymer may be provided as a solid material or as an emulsion in oil. The flocculant composition may further comprise a heat-activated or pregelatinized starch having flocculating activity, as described further below.

The coagulant is preferably a polymer having a molecular weight less than 1 million Daltons and a mole % cationic monomer of at least 50%; preferred coagulants include epichlorohydrin-dimethylamine copolymer (polyEPI/DMA) and a polymer of diallyl dimethyl ammonium chloride (polyDADMAC). Other useful coagulants include polyaluminates and tannin amines.

The total amount of additive, including coagulant and flocculant(s), is typically in the range of about 2 ppm to about 500 ppm relative to the process water.

The process water may be downstream waste water (produced water) from an oil sands mining operation, in which case addition of the coagulant follows separation of the produced water from the bulk of the oil obtained from the oil-sands mining operation.

Other flotation additives, such as a low density oil, a silica nanogel, a low boiling liquid (e.g. bp<90° C.) or other foaming agent, may be added to the produced water, preferably prior to addition of the coagulant.

These and other aspects of the invention will become apparent upon review of the following description and accompanying figures.

Figure 1:
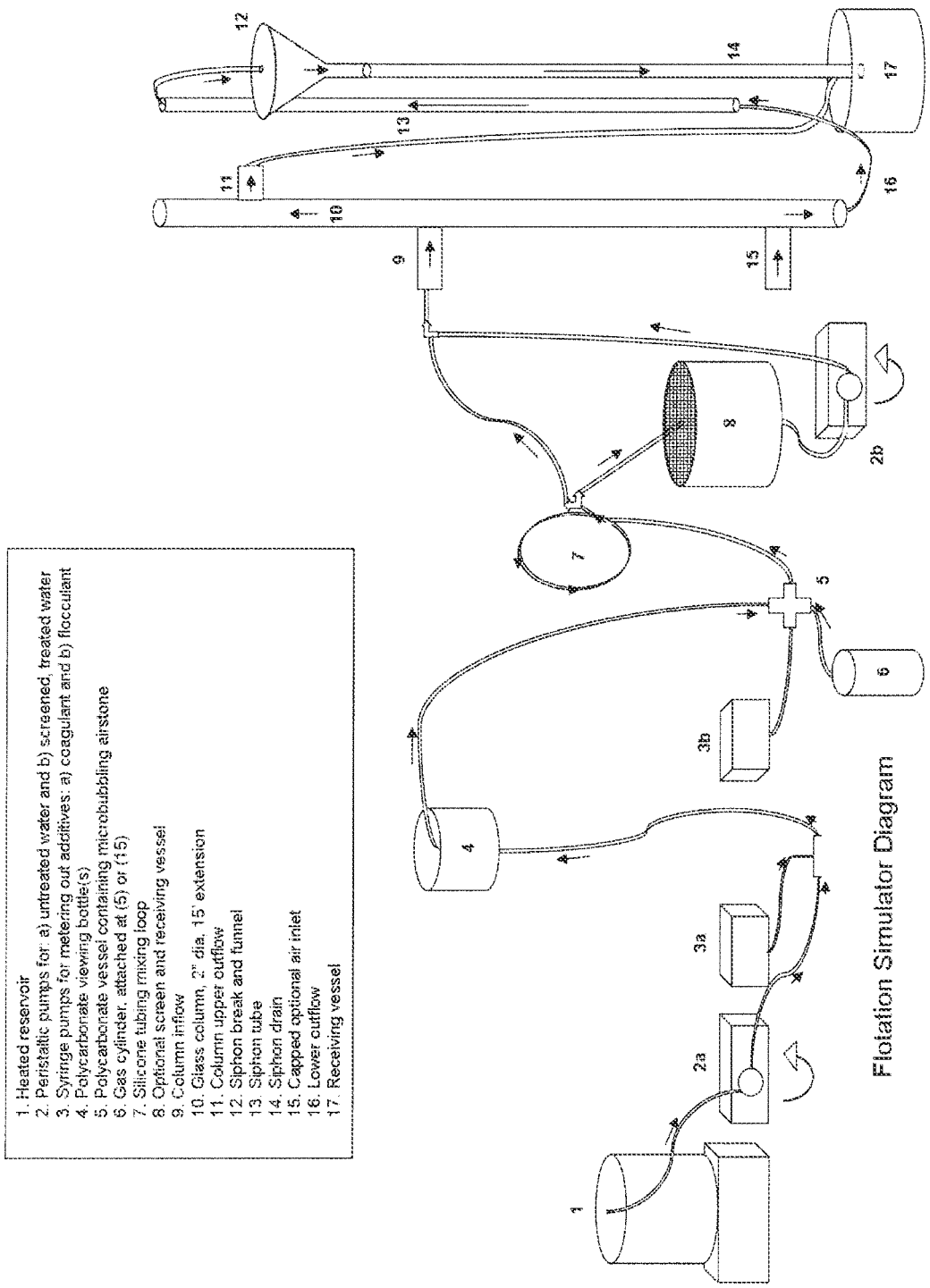
FIG. 1 is a schematic diagram of a 5-gallon, flow-through simulator of treatment and clarification of produced water from an oil-sands operation via steam-assisted gravity drainage (SAGD).

Control: no chemical additives, no entrained air.

Treatment A. Coagulant, no flocculant, no entrained air.

Treatment B. Coagulant, no flocculant, plus entrained air. The aqueous phase was significantly murkier and retained significantly more amber color than the Treatment A sample.

Treatment C. Coagulant plus flocculant, no entrained air.

Treatment D. Coagulant plus flocculant plus entrained air.

Treatment E. Coagulant plus flocculant plus entrained air. Oily solids were removed from the sample, leaving only the clarified water. The oily solids were removed via various approaches including filtration, screening, skimming, and decanting.

DETAILED DESCRIPTION

I. Chemical Treatment

The process of the present invention is useful for clarification of an aqueous liquid having suspended and/or emulsified solids, as found in wastewaters generated in, for example, agricultural, mining, industrial, and sewage treatment operations. The types of suspended and emulsified residuals are many and varied. For example, soil components and biological remnants may occur in water used in recovery and handling of crops and in food processing. In another embodiment, the process is applied to waste waters from mining operations. Prominent examples include oil and oily solids in water used in oil recovery operations. The working examples herein include descriptions of clarification of wastewaters from oil sands processing, from an automotive plant, and from a coffee plantation.

The process is particularly useful for clarification of downstream process water, also termed produced water, generated in oil sands mining operations, which may entail steam-assisted gravity drainage (SAGD), cyclic steam stimulation (CSS), or surface mining operations. As described above, the produced water from SAGD recovery, after removal of the bulk oil, often has high solids levels, e.g. greater than 30% and up to 60% or more. The solids include bitumen as well as sand and other minerals. Other problematic waste water streams include tailings slurries from surface mining and mature fine tailings (MFT) from large settling ponds or lagoons. These can also have solids levels of 30% or more.

The process preferably incorporates the clarification method described in Sikes et al. (PCT Pubn. No. WO 2007/047481; U.S. Pubn. No. 2009/0127205, which is incorporated herein by reference). The Sikes et al. method provides high clarification at very low doses of active agents, relative to earlier employed processes. Separation of phases can be accomplished in a few minutes, as compared to several hours or more via earlier employed commercial methods. This method is summarized as follows.

The process may include a first pH adjustment step. In this step, the pH is adjusted into the range of about 2 to 4, preferably about 3 to 3.8, which neutralizes carboxylic-containing organic phases which would otherwise act as dispersing agents to stabilize the oil-in-water emulsion.

Addition of a polycationic coagulant follows this pH adjustment. A preferred polycation for this step is copolymerized epichlorohydrin and dimethyl amine, or poly EPI/DMA. Typically, upon addition of the polycationic coagulant, as the coagulant masks the anionically dispersed oily droplets of the reverse emulsion, whereupon the oily droplets are further de-emulsified and tend to slowly coalesce and separate from the water. Preferably, a brief incubation period is allowed before addition of flocculant, below. With adequate stirring, an interval of approximately 5-30 seconds is sufficient for this step, although longer intervals are effective as well.

Other polycationic coagulants that may be used at this stage include polymers of cationic monomers such as ammonium alkyl acrylamides (e.g. quaternized dimethylaminopropyl acrylamide), ammonium alkyl methacrylamides (e.g. 3-methacrylamidopropyl trimethylammonium chloride), ammonium alkyl acrylates (e.g. 2-acrylatoethyl trimethylammonium chloride), ammonium alkyl methacrylates (e.g. quaternized dimethylaminoethyl methacrylate), dialkylammonium salts (e.g. diallyl dimethyl ammonium chloride), allyl trialkyl ammonium salts, and amino acids such as lysine or ornithine. The cationic monomer is present at least 50 mole %, preferably at least 70%, and more preferably at least 80 mole %. In one embodiment, the polymer is a homopolymer. Other monomers, if present, are neutral monomers such as acrylamide or methyl (meth)acrylate. Examples are homopolymers of diallyl dialkylammonium salts or allyl trialkyl ammonium salts.

Molecular weights of the above-recited polycationic coagulants are generally at least 5000, though higher molecular weights, e.g. 20,000, 30,000, 50,000, 75,000, or about 100,000 Daltons, are generally more effective. The molecular weight is generally less than 1 million Daltons, and preferably less than 500 kDa.

Other cationic coagulants that are useful and available commercially include are ferric and aluminum salts and tannin amines. Polymers of aluminum chlorohydrate, also called polyaluminates or poly aluminum chloride, are particularly effective in saline systems. Tannins are polyphenolic compounds that occur naturally in various vegetative materials. They can be recovered from biological extracts and waste streams. Polymeric tannin amines can be obtained by polymerizing a tannin with an aldehyde and an amine. They generally have molecular weights up to about 10,000 Daltons. Both polyaluminates and tannin amines are available from SNF Inc., Riceboro, Ga., as well as other suppliers. The different types of coagulants may also be used in combination.

A preferred coagulant is polyepichlorohydrin/dimethylamine (polyEpi/DMA, SNF Inc., FL 2749), available as a commercial product at 50% actives in water. PolyEpi/DMA is a polycationic material. Also preferred is poly diallyl dimethyl ammonium chloride (polyDADMAC), another polycation. This material is available as a dry powder at 100% actives (Floquat TS 45). It can be readily solubilized in water at up to 50% actives, depending on molecular weight (Mw). Both the polyEpi/DMA's and the polyDADMAC's are available in a range of Mw's up to about 1 million, but are less readily solubilized at the higher Mw. Products in the size range about 100 kDa are preferred, because they exhibit good performance and high solubility, although higher Mw materials are also useful.

The amount of polycationic coagulant used is generally in the range of 1 to 100 ppm, preferably 5 to 50 ppm or 10-20 ppm. Levels of 2.5, 5, and 10 ppm, in combination with similar levels of flocculant (described below) have been effective in field tests. A level of 20 ppm, in combination with 40 ppm flocculant, was effective even in downstream wastewaters having about 60% solids. This level is clearly substantially less than the several hundred or thousands of ppm of such agents which have been commonly used in conventional practice.

The process further employs a flocculant material, which may be added subsequent to the polycationic coagulant. The flocculant is a water-soluble, high molecular weight hydrogen-bonding agent which serves to bridge oily droplets and particulates, flocculate them and bring them quickly out of solution or emulsion. Preferred hydrogen-bonding agents are acrylamide copolymers (commonly termed PAMs). The copolymer may be an anionic acrylamide copolymer, such as an acrylamide/acrylate copolymer (as described above) or, in a preferred embodiment, a cationic acrylamide copolymer ("cationic PAM"), such as an acrylamide/allyl trialkyl ammonium copolymer. A representative cationic acrylamide copolymer is acrylamide/allyl triethyl ammonium chloride (ATAC) copolymer.

These acrylamide copolymers typically have about 50-95 mole %, preferably 70-90 mole %, and more preferably around 80-90 mole % acrylamide residues. The molecular weight of the flocculant copolymers is preferably about 5 to 30 million, more preferably 12 to 25 million, and most preferably 15 to 22 million Daltons. In each case, the mole % acrylamide is at least about 50%, and the molecular weight is at least 1 million Daltons, preferably at least 4 million Daltons.

Other cationic monomers that can be copolymerized with acrylamide to form a flocculant copolymer include those noted above, i.e. ammonium alkyl (meth)acrylamides, ammonium alkyl (meth)acrylates, diallyl dialkylammonium salts, and allyl trialkyl ammonium salts. As noted above, the mole % acrylamide in these flocculants is at least about 50%, and more preferably 80-90%.

The cationic acrylamide copolymers are generally more heat-stable in these settings than the anionic acrylamide copolymers. At temperatures above about 80° C., use of cationic polyacrylamides produces separated flocs that remain stable for several hours or longer, even at 95° C.

Flocculants that are preferred include copolymers of acrylate and acrylamide (anionic polyacrylamides, PAM's, such as AN 923 SH from SNF Inc.) or copolymers of allyl triethyl ammonium chloride (ATAC) and acrylamide (cationic PAM's such as FO 4490 SH from SNF Inc.). In many produced waters, either anionic or cationic PAM's are effective as flocculants, provided the molecular size is sufficient. However, for treatment of specific types of produced water, certain types of PAM's are preferred.

For example, in SAGD (steam assisted gravity drainage) produced water, PAM's less than approximately 5 million in Mw are noticeably less effective than larger ones, with sizes of 10 million in Mw and higher preferred. The anionic PAM's that are useful as flocculants typically contain 10 to 30% anionic residues, i.e. acrylate residues, with the remainder as acrylamide, which is uncharged but has a polar hydrogen-bonding group ($-NH_2$). The anionic PAM's are available in Mw's well above 10 million. The cationic PAM flocculants typically contain 10 to 30% cationic residues, i.e. the ATAC residues, but may range into higher % ATAC's as well. The cationic PAM flocculants also have high Mw's, but the Mw range is somewhat lower than that of the anionic PAM's, typically at 5 to 8 million Mw. Although this is less than optimal for flocculation activity, the cationic PAM's have the advantage of greater tolerance to high temperatures in aqueous environments.

That is, an anionic PAM will tend to lose activity at 90° C. within about 30 minutes in aqueous solution. In contrast, a cationic PAM will retain its activity as a flocculant for several hours under these same conditions. At temperatures of 80° C. or less, both anionic and cationic PAM's are thermally stable. Hence, for SAGD produced water, which is generally close to 90° C. when first treated and may remain at temperatures above 80° C. throughout the entire process stream, cationic PAM flocculants are often preferred. For produced waters that are at lower temperatures, as in surface mining operations and in waste streams that are taken off-site for disposal, anionic PAM flocculants are often preferred.

Another factor to consider in selecting an anionic versus a cationic PAM as flocculant is the overall charge of the particulates to be agglomerated. That is, emulsified oily solids or soil particulates that contain a significant mineral component, such as clays and sands, have binding sites that overall have higher affinities for anionic binding agents. Consequently, anionic PAM's may be preferred in such an application, although the mineral faces also will bind satisfactorily to cationic PAM's, albeit with somewhat lower affinities. On the other hand, biological process streams, such as animal waste streams and process streams associated with food processing, contain biological particulates that mainly exhibit anionic binding sites on their external surfaces. Consequently, cationic PAM's may be preferred in such applications.

In another preferred embodiment, the acrylamide copolymer is provided in combination with an activated polysaccharide, such as an activated starch (see Sikes et al., above). The ratio of these components (activated starch:copolymer) is typically in the range of 0.1:1 to 100:1, preferably 0.5:1 to 10:1, more preferably 1:1 to 5:1.

The activated polysaccharide is an extremely high molecular weight, water soluble entity having flocculating activity. For example, the approximate Mw of an activated solubilized starch used in the accompanying Examples (Pregel 46) is estimated to range from approximately 10 million to greater than 100 million. Because molecular weights in this range are difficult to assign with confidence using conventional technologies, they may be even higher; measurements made by multi-angle laser light scattering (MALLS) suggest Mws greater than 100 million, even as high as 2 billion, as indicated by particle size. These very large molecules have flocculating activity, in contrast to conventional, lower molecular weight starches.

The activated polysaccharide is preferably an activated starch. Activated wheat and corn starches tend to remain active at higher temperatures than activated potato starches, and thus are particularly useful in these high temperature processes. However, activated potato starch, particularly steam-activated, pregelled starch, is also generally effective.

The activated starch is typically prepared by aqueous thermal treatment of a native starch, such as potato, wheat, or corn starch, effective to partially water solubilize and partially gel the starch. For example, the activated starch may be prepared by heating an aqueous suspension of starch for up to about 2 hours, preferably 0.5-2 hours, at a temperature between 70° and 100° C., depending on the type of starch used. For potato starch, preferred temperatures are about 70-80° C., especially 70-75° C.; for wheat starch or corn starch, preferred temperatures are between about 85° and 100° C., especially 90° to 95° C. The suspension preferably contains about 5-10 weight % or less of the starch in water. Preferably, the pH of the suspension is ≤7, e.g. about 6-7.

Alternatively, a starch suspension or slurry may be activated by rapid heating, such as exposure to steam for brief intervals, e.g. a few seconds to 10 minutes, typically about 1-4 minutes (jet cooking). Again, higher temperatures are typically used for wheat and corn starches, as described further below.

The flocculant compositions may be prepared by combining the activated starch suspension, after heat treatment as described above, with an aqueous solution of the acrylamide polymer. Alternatively, the acrylamide polymer may be included in the suspension of native starch as the latter is activated in a manner described herein.

The combined weight % of starch and acrylamide polymer in the final composition is typically about 0.1 to 50%, preferably 0.1 to 25%, more preferably 0.5 to 15%, and most preferably 1% to 10%. In selected embodiments, the combined weight % of starch and acrylamide polymer is about 2 to 5%.

Flocculated materials formed via the action of the PAM/activated polysaccharide compositions tend to be large and very light, having low density. These flocculated materials rapidly form into a robust and integrated floating layer that is easily skimmed or filtered, leaving behind a greatly clarified aqueous layer.

Because the polycationic coagulant tends to interact with anionic flocculants (e.g. acrylamide/acrylate), their effective concentration will be lessened with respect to their interaction with suspended particles. However, these additives may be used together with good effect if the overall dosing is increased to counteract their interaction.

The amount of flocculant composition used is generally in the range of 1 to 100 ppm, e.g. 2.5-50 or 10-30 ppm. Levels of 30 ppm alone, or 2.5, 5, or 10 ppm in combination with similar levels of a polycationic coagulant, were effective in field tests. A level of 40 ppm, in combination with 20 ppm coagulant, has been shown to be effective even in downstream wastewaters having about 60% solids.

Typically, more coagulant is used than flocculant. For example, a suitable ratio of coagulant to flocculant is in the range of 2/1 to 5/1, although other ratios may be effective depending on the source of the produced wate4r and the specific flocculant and coagulant selected for use.

In general, the total amount of active additives used in the process is in the range of 2 to 500 ppm, preferably 2 to 100 ppm. In a preferred method, employing pH adjustment, a polycationic coagulant, and a starch/cationic PAM flocculant, as described above, the total amount of active additives is preferably in the range of about 2 ppm to about 60 ppm relative to the process water. When the starch is not included, an amount in the range of about 5 ppm to about 100 ppm relative to said process water is typically employed; and when no pH adjustment is done, an amount of 5 ppm to about 500 ppm relative to said process water is typically employed.

The entire exemplary sequence (adjusting pH, staging in the coagulant, addition of the flocculant, and skimming/filtration to separate the aqueous layer from the oily/bituminous solids) can generally be accomplished in a few minutes. The pH of the aqueous layer may then be quickly neutralized via addition of alkali.

Certain steps in this exemplary sequence may be omitted, particularly if the others are enhanced accordingly. For example, the pH adjustment may be omitted (for example, to avoid possible corrosion of mild steel containers and pipes) if the dosing of coagulants and/or flocculants is increased to overcome the dispersancy that is inherent in the non-neutralized oily/bituminous phase. In practice, it is possible to clarify and separate the aqueous and petrochemical phases in a matter of a few minutes, employing actives concentrations in the range of 2.5-100 ppm, e.g. 10-60 ppm, if the pH adjustment is utilized. If the pH adjustment is not implemented, a combined concentration of actives of 100-500 ppm is typically required. However, this higher dosing is still generally much less than used in conventional treatments, and provides improvements in water clarity, rapidity of response, and ease of separation as compared to conventional treatments.

By varying the relative amounts of the additive agents, particularly with respect to the activated polysaccharide, the density of the flocculated solids layer may be adjusted to promote settling of the solids or, as indicated above, to produce a floating layer that rapidly rises to the top, which is often preferable in practice. The flocculant compositions described herein, containing activated polysaccharides, tend to rapidly produce a low density solids layer which often floats on top of a clarified aqueous layer. However, it was nonetheless seen as desirable to increase the positive buoyancy of the flocculated materials, in order to obtain a more distinct, efficient and stable separation of phases.

II. Flotation Method

In the disclosed method, flocculated oils and/or solids formed by addition of a polycationic coagulant and flocculant, as described above, are rendered highly buoyant by inclusion of a gaseous phase of microbubbles of a gas together with the flocculant. The gas may be air, nitrogen, methane, another hydrocarbon, e.g. propane, an inert gas, such as neon or argon, or another such gas. For reasons of convenience and economy, air is typically used, although a hydrocarbon may be preferred if it is seen to provide greater adhesion to oily contaminants.

As described above, upon addition of a polycationic coagulant to the oil-in-water emulsion, the oily droplets are de-emulsified and coalesce and separate from the water. This addition may be followed by an incubation period, typically about 5 to 30 seconds or more, to allow coagulation to occur.

Following coagulation, gaseous microbubbles are introduced simultaneously with the flocculant. The gaseous phase may be introduced via an eductor or other such device for generation of microbubbles. A dissolved air flotation (DAF) pump may be used; a preferred pump is an Edur DAF pump, available from Shanley Pump and Equipment, Inc. The dissolved gas (air) is released from solution simultaneously with, or more preferably prior to, introduction to the process stream with the flocculant. Release of pressure simultaneously with, rather than prior to, introduction to the process stream was found by the inventors to be less preferred, in view of the possible delay in formation of the bubbles when flocculation is occurring.

Thus, the microbubbles are present in the process stream when the flocculant begins to act on the coagulated particles. As the flocs form, the microbubbles are stably encapsulated within agglomerates of oily solids or semisolids, causing the flocs to float quickly to the surface when the turbulent stream reaches the quieter volumes of the skim tank or other large-volume vessel or device in the process stream.

Some of the bubbles may stick to the outer surfaces of the flocs as well, as occurs in processes in which bubbles are introduced after flocculation has already occurred. However, these adherences are generally unstable and transient and do not easily withstand stirring, rapid or turbulent flow, or other manipulation. In current practice, the efficiency of flotation devices that rely on adhesion of bubbles introduced to already-flocculated materials is said to average only around 30%.

For example, some prior art processes describe the introduction of a gas from a pressurized solution into wastewater after flocculation has occurred. Arnaud (U.S. Pat. No. 6,960, 294) describes the release of a microbubble stream in a receiving vessel, after addition of chemical treatment and after the initiation of both coagulation and flocculation. A pressurized phase for delivery of gas bubbles from solution is introduced after the chemical inputs. Alternatively, the pressurized liquid containing the dissolved gas is introduced after the coagulant input and before the flocculant input, but in both cases release of pressure to generate the bubbles occurs after flocculant input. Accordingly, flocculation has already occurred when the bubbles are generated. In this circumstance, in the current inventors' hands, poor adhesion of bubbles to the flocs resulted. That is, when bubbles were introduced after flocculation, the bubbles tended to pass around the flocs, with insufficient adhesion. (See Example 6 below.)

Galvan et al. (U.S. Pat. No. 5,693,222) describes a wastewater processing system containing a "pre-contact chamber" to which a wastewater feed stream, a pressurized fluid containing dissolved gas, and an optional "flocculant or surfactant" are simultaneously fed. There is no mention of a coagulant or of any chemical treatment of the wastewater prior to exposure to the gas (which is released from solution by release of pressure upon entering the pre-contact chamber). U.S. Pat. No. 3,932,282, to Ettelt, shows a system in which bubbles of air, released from a pressurized solution, are added to a coagulated stream, to which a flocculant is then added.

Figure 3:
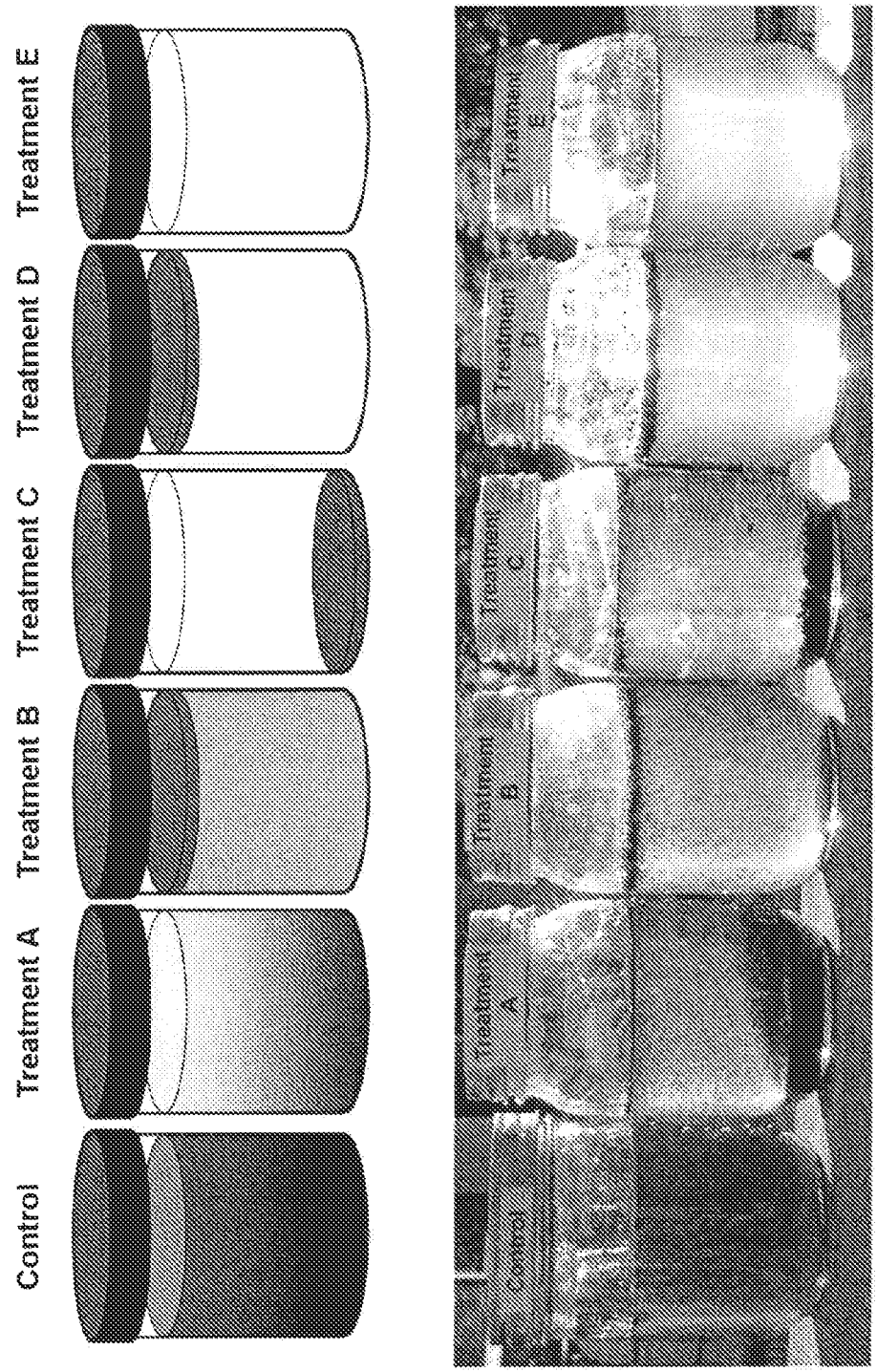
FIG. 3 shows the schematic appearance (top row) and actual appearance (bottom row) of SAGD produced water in 0.4 liter bottles after treatments using the 250-gallon simulator, using procedures described in Example 8 and 9. The samples had been set on the lab bench for 5 minutes, allowing the turbulence to subside, and the oily solids to settle or float, depending on the treatment. In treatments A-D, the oily solids were retained in the sample. The treatments were as follows.

In the inventors' hands, incorporation of gas bubbles in the absence of the flocculant (either after coagulation or without coagulation) often caused re-emulsification of the coagulated drops or panicles. This effect is illustrated in FIG. 3, by comparing the Treatment B sample, in which coagulant was followed by entrained air with no flocculant, with the Treatment A sample, which employed coagulant alone. Although both samples are incompletely clarified (in comparison to Treatments C-E), the aqueous phase for the Treatment B sample was significantly murkier and retained significantly more amber color than the Treatment A sample. Subsequent addition of flocculant to a sample such as the Treatment B sample resulted in inefficient flocculation and separation, since the coagulated phase had been disrupted.

Accordingly, in the preferred embodiment of the present invention, a coagulant is first added to the process water, and the gas microbubble phase, such as air, is then incorporated, along with the simultaneous input of flocculant. A short incubation time may precede addition of the gas bubble phase and flocculant. The gas phase may be introduced through the atmospheric port of an eductor, or via a DAF pump as noted above (as long as microbubbles are present when the gas feed is introduced with the flocculant; that is, the gas is not dissolved in a pressurized solution at this point). The fluid phase then contains the coagulated particulates, an abundance of microbubbles, and a concentrate of newly added flocculant. As the flocculant becomes distributed, beginning immediately and proceeding typically over a few to several minutes, flocculated and agglomerated oily solids form in the presence of the microbubbles, which become incorporated into the oily solid materials. The disclosed process thus efficiently separates buoyant phase of solid or semisolid flocculated materials from a clarified aqueous phase.

During the formation of the flocs of agglomerated oily solids, it is advantageous to incorporate a tank, such as a swirl tank, having a residence time of up to a few minutes. The "swirl" is generated by directing the flowing stream along the inner surfaces of the tank, typically having a cylindrical shape, either at the bottom or elsewhere. This acts to decrease turbulence of the fluids and to promote enlargement of the flocs and envelopment of the microbubbles into the solid agglomerations. A skim tank, if available, can serve this function. However, if there is no large vessel to provide a slower velocity and a sufficient residence time for optimal formation of the flocs and agglomerated solids, it is preferable to incorporate a swirl tank in the process stream.

III. Separation Techniques

As noted above, the disclosed process efficiently separates a wastewater process stream into separate phases, including a clarified aqueous phase and a buoyant flocculated solid or semisolid phase. The phases may be separated in various ways; for example, the buoyant flocs, containing entrained microbubbles, may be skimmed, screened or decanted readily, leaving behind the clarified aqueous layer. The water layer may also be decanted or drained from a lower level of the vessel.

Flotation as described herein, using microbubbles introduced with the flocculant, may also be a component of an overall separation strategy that encompasses removal of heavier phases via sedimentation. In such cases, oily solids may be formed into heavier, more solid agglomerations by addition of heavy clays and sand particles, to which the oily phases adhere upon flocculation and agglomeration, thereby facilitating separation via sedimentation, centrifugation, hydrocloning, screening, and other such methods. Typical clay and other mineral components are micron-sized in linear dimensions, with specific gravities in the range of 2.0 to 3.0, and may range about 0.1 to 1.0% by weight and higher. However, even in such systems, some agglomerated components remain neutrally buoyant and/or positively buoyant. For these components, entrapment of microbubbles within the flocs, using the processes disclosed herein, enhances separation (flotation) of these materials from the heavier-than-water components.

The clarified produced water stream may be separated from the flocculated solids by high-volume, continuous-throughput screening. The screening device preferably incorporates an inclined screen of stainless-steel mesh of wedge wire having appropriate pore size, typically in the range of 200 microns. Another separation strategy employs a decanter centrifuge, which works continuously in a flow-though mode to spin an upper clarified aqueous phase out the top and push flocculated and agglomerated solids phase out the bottom of the stream as it moves though the decanter. Other separation strategies and devices such as hydroclones, filter presses, vacuum-assisted filters, and combinations of these are contemplated for use.

IV. Optional Additives

Flotation of oily solids may be enhanced by addition of a light oil or other lower-density material having an affinity for the agglomerated oily solids. These attach to the lower density material and layer out at the upper surface for removal by skimming or decanting. The light oil is preferably added before addition of the coagulant, but may be added after the coagulant but preceding the flocculant.

For example, mineral oil or even gasoline, having specific gravities in the range of 0.80 to 0.90 or less, may be injected into the process stream at a dose in the range of 1.0 weight % or less. When the oily solids are formed into flocs, they tend to associate with the light oil and are brought to the top of the fluid phase once its velocity is slowed as in the skim tank.

Solid materials having an affinity for hydrophobic solids and containing vapor inclusions may also be used as flotation aids. Examples of this type of material include the nanogels from Degussa Company. These are comprised of silica particles, with or without hydrophobized surfaces, that contain entrained air or other gases. Nanogels particles are micron-sized and may be incorporated into flocculant formulations for example and injected into the process stream. Upon flocculation of the oily solids, the agglomerations plus nanogel particles readily float and may be removed via skimming or decanting. With time, however, the nanogels imbibe water, and after several minutes the agglomerated solids tend to sink.

EXPERIMENTAL

I. Materials and Methods

A. Additives

Flopam™ AN 923 SH(SNF Inc.) is a 20:80 acrylate:acrylamide (anionic PAM) of approximately 12 million Mw. (Molecular weight assignments are based on viscosity measurements.)

Flopam™ FO 4490 SH (SNF Inc.) is a 40:60 ATAC:acrylamide (cationic PAM) of approximately 6 million Mw.

Floquat™ FL 2749 is a PolyEpi/DMA of approximately 120,000 Mw.

AH2100 is a starch/copolymer composition containing a 2:1 weight ratio of Pregel 46, an activated starch obtained from Midwest Grain Products, approximate Mw 10-100 million, and Flopam™ AN 923 SH (above).

AH1100 is a starch/copolymer composition containing the same components as AH2100 but in a 1:1 weight ratio.

CH1100 is a starch/copolymer composition containing a 1:1 weight ratio of Pregel 46 (above) and Flopam™ FO 4490 SH (above).

Each of the three starch/copolymer compositions contains 15 ppm isothiazolinone (Kathon, Rohm & Haas) as a preservative.

B. Assays

Vial tests. Initial assessments of formation of an aqueous phase separate from an oily-solids phase were made on a small scale in 20 ml glass vials. SAGD (steam-assisted gravity drainage) produced water was obtained from several sites in the oil-sands region of Alberta, Canada. Samples of 10 ml of the oily water were pipetted into each of a set of vials, capped tightly, and preheated in a forced-air oven at 90° C. The samples remained as stable reverse emulsions of oil and oily solids in water for months under these conditions, although typically they were used in experiments within a few days.

In a typical experiment, a coagulant was first pipetted into the vial, to provide a dose usually in the range of 25 to 100 mg/L (ppm) of active agents. For example, a coagulant stock solution of polyepichlorohydrin/dimethylamine (polyEpi/DMA, SNF Inc., Floquat™ FL 2749, MW approx. 120,000) at 50 mg actives per ml was first prepared from the commercial product at 50% actives in water. To provide a dose of 100 ppm in the 10 ml of the produced water in the vial, 20 µL of the stock solution were added. After a period ranging from about 30 seconds to 1 minute or less, if the dosing was well matched to the sample, visible microparticles of coagulated oily solids could be seen in the vial. If the coagulant dose was too low or too high, the dispersed particulates did not coagulate. Rather, the emulsion would remain anionically dispersed at the too low dose or would become cationically dispersed at the too high dose, and in either case would fail to begin the process of separation.

The next step involved the addition of a flocculant, typically provided to a dose of 5 to 60 mg per liter, depending on the characteristics of the produced water. For example, a flocculant stock solution of a copolymer of acrylate and acrylamide (an anionic polyacrylamide, PAM, such as Flopam™ AN 923 SH from SNF Inc. 20/80 acrylate/acrylamide, Mw 12 million Da) or of a copolymer of allyl triethyl ammonium chloride (ATAC) and acrylamide (a cationic PAM such as Flopam™ FO 4490 SH from SNF Inc.; 40/60 ATAC/acrylamide; Mw 6 million Da) at 2 mg/ml of active agents was prepared from the dry powders at 100% actives. To provide a dose of 10 ppm of flocculant in the vials, for example, 50 µL of the stock solution were pipetted into the 10 ml of produced water. This vial was then swirled by hand for a few seconds, and the flocs were allowed to form over the next minute or so, beginning almost immediately but with agglomeration of flocs occurring and floc size increasing over the next few minutes.

Jar tests. The vial tests are useful in initial assessments of treatment chemicals, doses, and protocols. The vial tests may also be appropriate when the supply of available produced water is limited, for example when received at an external site or lab that is remote from the production site. However, because the vials have relatively high surface areas and a limited volume of water to be clarified, the effective amounts of the treatment chemicals and the oily particulates, or both, may become skewed via interactions with the inner surfaces of the vial. In addition, once a prospective treatment strategy is identified, it is necessary to generate a sufficient volume of treated water for subsequent analytical measurements of residuals of oily particulates, suspended solids, total solids, and the like. For these reasons among others, jar tests are commonly run for example as follows.

First, 300 g of produced water are weighed into a 400 ml glass jar. To this is added a polycationic coagulant as above, typically in the range of 25 to 100 ppm, although higher doses are encountered in practice from time to time. The jar is swirled manually, then placed on the bench top for about 1 minute to allow the oily phases to coagulate into micron-sized particulates. Next, the flocculant is added, typically in the range of 5 to 60 ppm, and the jar is again swirled vigorously by hand for 10 to 30 seconds, and set on the bench for continued flocculation and agglomeration of solids. After a period of another minute or few minutes, large agglomerations of oily solids, typically up to the millimeter range in size, and higher in some cases, are formed. Depending on the composition and characteristics of the produced water, these solids typically are mildly positively buoyant, neutrally buoyant, mildly negatively buoyant, or a combination of these.

The oily solids can be removed by filtration, screening, centrifugation or such methods. The clarified water then is ready for analytical assessments of residual oily chemicals and other components.

Flow-through flotation simulations and field trials. Treatment chemicals and protocols that exhibit promising results in the jar tests are next evaluated at larger scales and under dynamic conditions. The object is to validate the effectiveness of the treatment at a more realistic scale, using freshly produced water, if available, under conditions of temperature and flow that better matched the operating conditions.

Flotation Simulators: 5-gallon, flow-through flotation simulator. As shown in FIG. 1, a laboratory apparatus was used to allow direct visual examination of flotation of oily solids in treated SAGD produced water in a flow-through system. A glass 14 ft. vertical column received the oily solids and the clarified water. In successful treatments, the oily solids readily floated to the top of the column, where they were decanted. The clarified water was continuously drawn off via an outflow at the bottom of the column, but through a siphon system that actually also decanted near the top of the column. A small mixing bottle placed at the point of entry of the flocculant, but which could be positioned elsewhere in the flow, allowed introduction of microbubbles of air or other gases. As shown in the Figure, the gas input (from cylinder 5) is concurrent with flocculant input (from reservoir 3b).

The 5-gallon volume of the system permitted continuous-flow conditions for a period of an hour or more, so that the treatment became stable, the performance consistent, and the results more reliable for each experiment.

Figure 2:
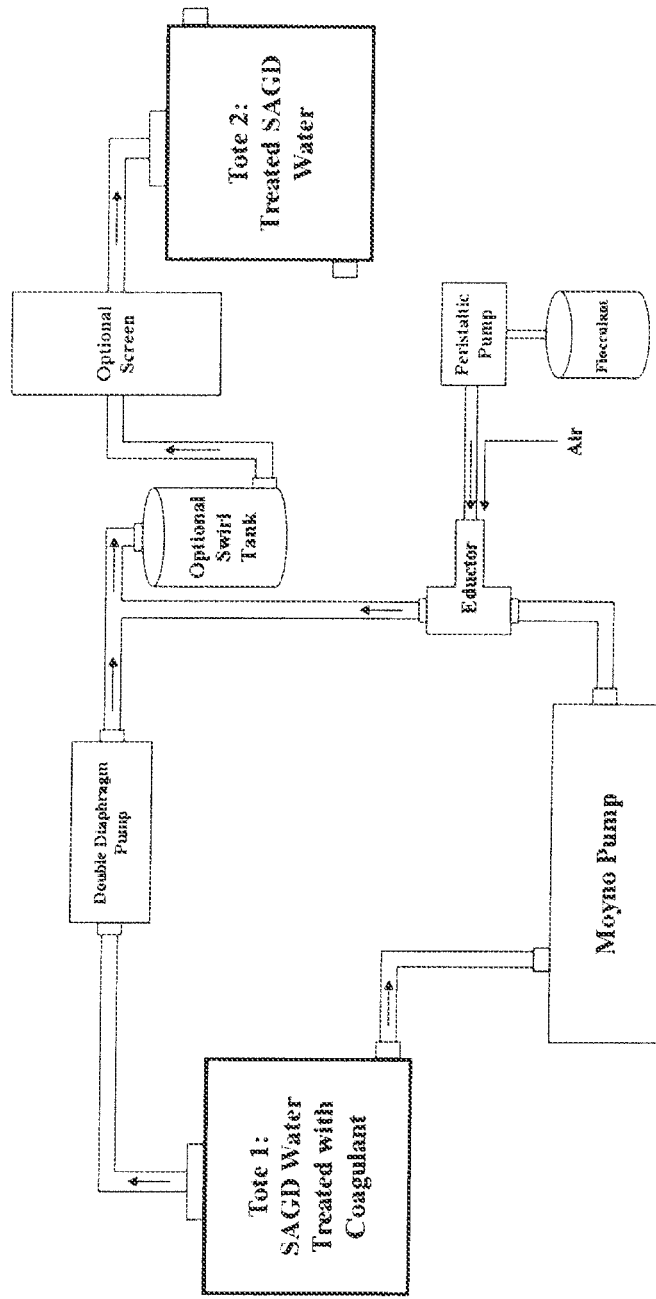
FIG. 2 is a schematic diagram of a 250-gallon, flow-through simulator for treatment and clarification of SAGD produced water with introduction of air via an eductor and separation of oily solids and clarified water by screening, skimming, and decanting.

Flotation Simulators: 250-gallon, flow-through flotation and screening system. A higher volume system was employed to study flow rates, flotation characteristics, and removal of oily solids by screening on a more realistic scale. As shown in FIG. 2, this pilot-scale device relied on SAGD produced water stored in 250-gallon totes, with flow provided by both a progressing cavity pump (Moyno® pump) and a double-diaphragm pump. Overall flow rates were as high as 50 gallons per minute. Produced water was treated with coagulants either as a pretreatment in the totes or in-line via a peristaltic pump. Flocculants were then added in-line via peristaltic pump, either with or without simultaneous air addition, through an eductor. If the eductor was used, the flocculant was fed along with the air into the inflow port of the eductor. In some arrangements, only the progressing cavity pump was used and there was only one flowing line. The Moyno® pump was chosen because it provides non-pulsing flow that is preferred for consistent and continuous eduction of air. In addition, the Moyno® pump generates a low-shear flow that does not re-emulsify oily solids, even at high flow rates.

In another arrangement, the flocculant with or without educted air was introduced as a side stream provided by the progressing cavity pump. This side stream fed into a main stream provided via the double-diaphragm pump. These experiments showed the utility of the simultaneous formation of flocs and entrainment of air, with the air and chemicals introduced into the main flow or as a side stream.

O&G (Oil and Grease) measurements. Criteria for successful treatment of oily produced waters include not just the clarification of the water of oily solids but also reduction of the residual hydrocarbon phases, whether they are ionic, polar, or fully hydrophobic, to an acceptably low level, preferably in the range of 10 to 20 ppm, most preferably to zero. Otherwise, the downstream processing equipment becomes fouled and needs to be serviced or replaced, in either case at unacceptable expense in terms of down time and direct costs. Cognizant of this, quantitative measurements of residual "oil and grease" (O&G), to use the common terminology of the industry, were routinely made for treated produced waters in the present studies.

Both the ASTM (American Society for Testing and Materials) and the US EPA (Environmental Protection Agency) have, at different points in time, issued standards for measuring O&G, and have updated the standards periodically (e.g., ASTM method D 7066-04 and EPA methods 1664, 9071A). The ASTM and EPA methods are fundamentally similar. The most basic approach is gravimetric, and it involves weighing the residual hydrocarbons per unit volume of produced water after separating the oily components from the produced water by solvent extraction and removing the solvent by mild heating and evaporation. With appropriate precautions, this approach avoids loss of volatile organic compounds, if such components have not already been vented in a prior heated process step. The gravimetric approach in its various forms is the standard to which other indirect, analytical methods are compared. These methods, particularly an infrared method, are in common practice because they are considered to be quicker and easier to implement than the gravimetric approach, while still generating reliable results.

These methods produce two categories of results: total O&G and total residual hydrocarbons. Total O&G includes all of the residual material after removal of the water and the water-soluble solutes. Total residual hydrocarbons include only the nonpolar materials (such as linear alkanes and cyclic/heterocyclic ring structures) that remain after a treatment with silica gel particles that is designed to remove polar and charged organic components. In the studies reported herein, the direct, gravimetric ASTM/EPA methods, along with an indirect spectroscopic (FTIR) method, were used.

Total oil and grease and total residual hydrocarbons are reported in Table 1 for the working examples described in detail below. Total oil & grease encompasses all ionic, polar, and hydrophobic material left in the water after clarification and removal of solids. This includes materials that precipitate as a "rag" layer upon extraction with hexane. Total petroleum hydrocarbons are the materials that are soluble in the hexane and remain soluble after treatment of the hexane extract with particulate silica absorbent material.

II. Working Examples

The chemical clarification process described herein was used alone or in combination with different flotation strategies. Examples 1-9 describe clarification of samples of produced water from oil sands operations, and Examples 10 and 11 are directed to agricultural and industrial wastewaters, respectively.

Table 1 shows residual hydrocarbons measured in produced water samples as treated in Examples 1-9. As can be seen, microbubble (air) entrainment with the flocculant, as described herein (see Examples 6, 8 and 9), produced superior results.

TABLE 1

Levels of residual oil and grease after clarification of SAGD produced water according to different treatments, following separation and removal of oily solids.

| Example | Treatment | Flotation Strategy | Total Oil & Grease (mg/L) | Total Petroleum Hydrocarbons (mg/L) |
|---|---|---|---|---|
| Control | none | none | 342.5 | 11.6 |
| 1 | Vial test: 100 ppm polyEpi/DMA, 20 ppm AH2100, 0.3% mineral oil | Light oil | Sample is too small to test | Sample is too small to test |
| 2 | Jar test: 150 ppm polyEpi/DMA, 40 ppm AH2100, 0.3% mineral oil | Light oil | 52.7 | 0 |
| 3 | Jar test: 75 ppm polyEpi/DMA, 40 ppm AH1100, 3 mg Nanogel | Nanogel | 86.8 | 0 |
| 4 | Jar test: 100 ppm polyEpi/DMA, 20 ppm AH1100, 10 cc methanol | Foaming agent | 105.3 | not tested |
| 5 | Flotation simulator: 125 ppm polyEpi/DMA, 20 ppm AH1100 | none | 69.0 | 2.6 |
| 6 | Flotation simulator: 100 ppm polyEpi/DMA, 40 ppm AH1100 | Simultaneous air and flocculant introduction | 51.7 | 0 |
| 7 | Flotation simulator: 125 ppm polyEpi/DMA, 20 ppm AH2100, 0.3% mineral oil | Light oil | 125.6 | 2.3 |
| 8 | 250-gallon simulator: 75 ppm polyEpi/DMA, 10 ppm AH1100 | Simultaneous air and flocculant introduction | 61.0 | 0 |
| 9 | 250-gallon simulator: 75 ppm polyEpi/DMA, 10 ppm AH1100 | Simultaneous air and flocculant introduction | 25.3 | 0 |

Example 1

Vial Tests of Clarification of SAGD Produced Water with Light Oil Added as a Flotation Aid; No Air Entrainment Produced water was obtained from several SAGD sites in Alberta, Canada. A sample of 10 grams of produced water was weighed into each of a set of 20 ml glass vials. These were tightly capped and placed in a forced-air oven at 90° C. overnight or longer. Stock solutions of coagulants (polyEpi/DMA and polyDADMAC as described above) were prepared at 50 mg actives per ml. Stock solutions of flocculants (anionic and cationic PAM's as described above) were prepared at 2 mg actives per ml. The flocculants tend to lose activity over a week, so typically they were used the next day. The coagulant stock solutions were more stable and could be used for several weeks without loss of activity.

Control treatment, no light oil. Coagulant was dosed into the vials by pipetting 15 to 30 µL of the stock solution into each vial to provide a dose of 75 ppm to 150 ppm coagulant respectively, depending on the source and characteristics of the produced water. The vials were swirled manually thr a few seconds, then set on the bench to allow coagulation to proceed. After 30 seconds to 1 minute, tiny but visible particulates of oily solids were seen to separate from the aqueous phase. Depending on the particular SAGD water tested, these particulates would remain neutrally buoyant and distributed through the water column or they would either slowly sink or float. In some instances, with no further treatment, each of these phases were present after a few minutes to 1 hour: floating, sinking, and neutrally buoyant. In all cases, the coagulated oily solids were very easily stirred and redistributed throughout the water column.

After 1 minute, flocculant was dosed into the vials by pipetting 50 to 200 µL of the stock solution into each vial to provide a dose of 10 ppm to 40 ppm flocculant respectively. The vials were again swirled manually for 15 seconds, then set on the bench to allow flocculation and agglomeration of oily solids to proceed. At the same time, the aqueous phase became fully clarified.

Again, the solid phases exhibited positive, neutral, and negative buoyancy, depending on the source of the water and often each of these phases were present in an individual assay. Photographic record of the experiment was made, hut sampling and analysis of the oily solids and the clarified water was limited due to the small amounts and volumes involved.

Experimental treatments, light oil added. Coagulant and flocculant were dosed as above, except that a small amount of mineral oil (specific gravity 0.80) was first added to the SAGD produced water in the vial. That is, amounts ranging from 10 to 100 µL of mineral oil were pipetted into each vial. At the lowest level of mineral oil (0.1 volume %), the experimental and control results were essentially equivalent. However, at 0.3 volume % mineral oil and higher, the oily solids were clearly and quickly seen to adhere to the mineral oil layer at the surface and float once the fluids settled down after swirling. These oily solids remained floating for several hours, and typically continued to float 24 hours later and longer.

Example 2

Jar Tests of Clarification of SAGD Produced Water with Light Oil Added as a Flotation Aid; No Air Entrainment

To address the limitations of sample sizes and to check the effective dosing at higher volumes of samples, jar tests with and without inclusion of the light oil "diluent" were made. The control and experimental treatments were the same as stated in Example 1, only adjusted to a larger scale. That is, rather than vials, 400-ml glass jars were used. The amount of produced water weighed into each jar was 300 g, and the volumes of stocks of coagulant and flocculant that were pipetted into the jars was likewise adjusted accordingly.

Control treatments, no light oil. After coagulation and flocculation, the oily solids were clearly seen to form into distinct particulates ranging around 100 microns in linear size and larger, upwards of 1 centimeter in some cases, and even larger. The fluid phase was essential clear, although lightly colored, typically a light yellowish to amber. However, again, the oily solids exhibited the full range of densities, from less than to greater than 1.0. Consequently, typically, there were floating, neutrally buoyant, and sinking components to the oily solids, often with each of these components in a single treatment.

Once the fluids had clarified, samples of the oily solids and clarified fluids were obtained by filtration using glass fiber filters (4.5 cm diameter, GF/C, Whatman) and mild vacuum. The fluids so obtained were completely free of suspended solids. Samples of these, ranging from 30 ml to 1 liter and higher, depending on the treatment, were taken for assessment of residual oil and grease. Sample volumes less than 30 ml were not suitable for gravimetric assessment of this type, although indirect spectroscopic assessments were made in these cases. The results, as shown in Table 1, indicated that the water was free of oily residuals to a very high standard of cleanliness, typically 20 ppm or less of total petroleum hydrocarbons (TPH), and often with essentially zero residual TPH.

Experimental treatments, light oil added. In the jars to which the mineral oil had been added to the produced water prior to the addition of coagulant and flocculant, the results were as they were in the corresponding vial tests as described above. That is, once the dose of mineral oil had reached 0.3 volume %, the oily solids that formed after the chemical treatments were seen to readily adhere to the oil layer and quickly float to the top along with the mineral oil once the fluids slowed after manual swirling. These were stable again, floating for several hours and longer, including overnight and for several days after.

For assessment of oil and grease, again the oily solids were removed from the aqueous phase by vacuum filtration using the GF/C filters. In the samples to which higher levels of mineral oil was added, a slight oil layer could be seen at the top. In such cases, this layer was decanted, or the water was drawn from the bottom of a separatory funnel, before assessing the residual oil and grease. These results also are shown in Table 1, again exhibiting minimal to zero TPH.

Example 3

Jar Tests of Clarification of SAGD Produced Water with Nanogel Added as a Flotation Aid; No Air Entrainment

Nanogels are comprised of micron-sized silica particles (5 to 700 um) having silyl surface coatings within which is a captive vapor phase, typically air. The nanogels are among the lightest solids known, with densities as low as 30 g per cubic meter. Because the nanogel particles have hydrophobized surfaces, they are known to interact well with oily substances. In this example, samples of nanogel particles (Nanogel TLD 101, Cabot Corporation) were evaluated in jar tests as flotation aids.

Control treatments, no flotation aid. These jars were prepared and sampled as described in example 2. Results of separation of oily solids and the aqueous phase were consistent with the control treatments of example 2.

Experimental treatments, addition of nanogel particles. Samples ranging from 1 to 3 mg of nanogel particles were weighed into the jars containing the heated produced water. Coagulant and flocculant were added and the clarification process observed. The oily solids readily floated when nanogel particles were entrained in the flocs and agglomeration. Some of the oily solids did not appear to interact well with the nanogel particles which are extremely buoyant and difficult to maintain within the fluid phase. Consequently, although the overall flotation of the oily solids was improved relative to controls, there remained some neutrally buoyant and negatively buoyant solids in the treated jars. In addition, the nanogel particles do imbibe water, and after a period of 10 to 30 minutes, the sinking of previously buoyant oily solids was noticeable. Overall, the experiments demonstrated that the nanogel particles, if incorporated into the flocs and agglomerates, did generate a readily buoyant oily solid phase. This phase needed to be removed from the aqueous phase relatively quickly because the silica particles, the mineral component of which are high density, become heavy and sink once the entrained air is replaced by the water.

Example 4

Jar Tests of Clarification of SAGD Produced Water with Aerosol Foam and Foaming Agents Added as a Flotation Aids; No Air Entrainment

Other low-density compositions such as foams are prospective flotation aids. Foams may be formed by use of in-situ foaming agents and reactions. If the foams are incorporated into the flocs and agglomerations when they form, the oily solids float. This concept was demonstrated in this example, again the control treatments with no flotation aid were run as described above with results equivalent to those of Example 2.

Experimental treatments, incorporation of foam. A foam was prepared by vigorously stirring air into a viscous solution of 2% polyol (Steol®, Stepan Co.), a surfactant (stearic acid) at 15 ppm. Amounts approximating 3 to 10% by volume were stirred into the produced water, followed quickly by addition of the coagulant then the flocculant. Again, it was visually evident that the agglomerated solids that did incorporate some of the foamy material were quite buoyant, but it was difficult to insure that all of the oily solids interacted with the foam. Consequently, not all of the oily solid phase was positively buoyant.

Experimental treatments, incorporation of a foaming agent. An interesting example of this type of approach was the injection of a low-boiling liquid at ambient (room) temperature, such as methanol (b.p. 64.7), ethanol (b.p. 78.4° C.), or hexane (b.p. 69° C.) into the produced water at 90° C. Upon rapidly heating, the injected liquids vaporize if they do not readily mix or if they do not mix too rapidly. In these experiments, the low boiling liquids were injected into the bottom of the heated produced water in a jar using a 30 cc syringe and small-bore silichem tubing right after introduction of the flocculant. Up to 10 cc of the liquids were injected within up to 15 seconds. Although the methanol and ethanol mostly simply mixed with the water, some vapor phase as bubbles did form and some of these were incorporated into, or stuck to, the agglomerations of oily solids that formed. Consequently, some of the oily solids were quite buoyant in these treatments, but not all. The injected hexane, on the other hand, is not miscible with water and did quickly vaporize and rapidly rise to the surface as bubbles, sometimes again being incorporated into the flocs or at least attaching to them. These, of course, floated very well. Much of the hexane under the conditions used simply rose to the surface and evaporated. Although the experimental conditions were not optimal, the results did demonstrate that microbubbles of a foaming agent that are present at the time of formation of flocs and agglomerations of oily solids do become part of the oily solids in part and do contribute to making them buoyant.

Example 5

5-Gallon Flow-Through Simulation of Clarification of SAGD Produced Water with Removal of Oily Solids by Filtration and Screening; No Air Entrainment Control treatments without filtration or screening. In this simulator, depicted schematically in FIG. 1, conditions of flow are incorporated into the evaluation of treatments and protocols in an apparatus that permits direct visual examination of the reactions in real time. The rates of flow during formation of the oily solids and separation in a device like a skim tank are designed to match those that occur in actual operations. Flow is supplied via peristaltic pumping. In the pump itself and some sections of the apparatus, silicone tubing having inner diameters of 3 or 6 mm (approximately 0.125 to 0.25 inch) were used, depending on the experiment. Flow rates up to 1 liter per minute were generated, which resulted in segments having rapid velocities such as encountered in the field, typically about 8 feet per second.

A 5-gallon, stainless steel kettle served as the produced water vessel. The kettle was placed on a large, heated stir-plate. The produced water was added to the kettle and pre-heated to 90° C.

Chemical additives were metered into the flow via syringe pumps. In these experiments, coagulants were introduced from a stock solution at 50 mg actives per ml. Flocculant was provided from a stock solution at 14 mg actives per ml. There were one or more viewing bottles in-line to permit visual examination of coagulation and then flocculation as it proceeds and to allow sufficient time for the reactions to occur prior to the next step. A mixing loop composed of silicone tubing in addition promoted dissolution of the flocculant. A glass column (7) with a 2 inch inner diameter was arranged vertically up to 15 feet with inflows optionally at mid-column or at the bottom. This permitted visual inspection of the movement of oily solids upon entering the column, which represented a receiving vessel such as a skim tank in a real operation.

The column outflows were placed at the top as a simple overflow to represent skimming or decanting. In addition, there was an outflow at the bottom but set up via a siphon break arrangement so that the actual outflow from the bottom was collected from or near the top. This kept heavy, sinking oily solids from flowing through the siphon tube so long as they were heavy enough to resist the upward flow toward the siphon break and funnel arrangement.

In these simulations, the flocs and agglomerations of oily solids were observed to form very well when the rate of flow was not too high. A typical experiment involved a flow of 100 to 200 ml per minute, filling the column (approximately 9 liters) in 45 to 90 minutes. Once the flow entered the column, it was substantially slowed, decreasing the turbulence of the fluids. This allowed further consolidation of the oily flocs, with individual agglomerations reaching cm sizes in some cases. Flotation of the oily solids was again mixed so that some floated, some sank, and some were neutrally buoyant in many cases. Occasionally, a particular produced water would become clarified with almost all of the solids floating nicely, but this was not predictable nor commonly encountered.

Treatments with filtration and screening. Several methods for separation of the clarified water and the oily solids were demonstrated. For example, it was possible to place a large basket filter fitted with a commercial paper filter (Bunn Coffee Filters, 5.5 inches height, 10 inches diameter) in the flow just after the mixing loop for formation of flocs. Completely clarified water, free of any discernable solids, was collected by gravity filtration into a large beaker. This fluid was pumped back into the lines leading to the column, to demonstrate visually what the inside of a skim tank would look like if the solids were removed from the treated produced water right after they were formed. In such a case, there was no need for skimming as such because essentially all of the residual oil was tied up in the flocs and the water was very clear. However, the large volume represented by the skim tank is still regarded as useful in providing a receiving vessel in the event of an upset or interruption of treatment along with a backup system for cleaning the water before it is sent to the later steps of the clarification stream.

Naturally, such a filter system would not be robust or reliable enough for an industrial setting and would be replaced with a stainless steel or other durable screening device.

In the next set of experiments, stainless steel, tubular screens (Flowtech Inc., 8 inches height, 1 to 1.5 inches inner diameters) were placed in the flow after the mixing loop and formation of flocs. The basket screens were placed in large beakers. The oily solids were contained within the tubular screens and the clarified water flowed out of the screens and into the beakers. Again, the clarified water was next pumped into the column as representative of the skim tank or other large-volume receiving tank.

The clarified produced water was separated from the oily solids via filtration or screening and collected as 1 liter samples for each experiment. O&G measurements consistently indicated little or no residual hydrocarbons in any of the filtered samples. Screened samples in which 100 mesh (100 openings per inch, equivalent to 150 micron pore size) screens were used contained little or no residual hydrocarbons or particulates. Screens with higher mesh ratings (smaller pore sizes) naturally also removed all of the oily solids, but these screens became clogged too quickly to be useful in these experiments. Baskets with 50 mesh screens (300 micron pore size) often did not remove all of the oily solids that had formed just past the mixing loop, such that water samples collected from these experiments needed further filtration prior to O&G analysis. However, if the flocs were permitted to agglomerate into oily solids of larger dimensions before screening by aging for a few more minutes in the column, the 50-mesh screen performed well if placed at the outflow of the column. Consequently it is useful to match the characteristics of the screen to those of the produced water and to place the screen appropriately in the process stream.

Example 6

5-Gallon Flow-Through Simulation of Clarification of SAGD Produced Water with Simultaneous Flocculation and Air Entrainment as a Flotation Strategy A micro-bubbling airstone, designed to provide microbubbles for degassing solvents used in liquid chromatography (Hewlett Packard Company) was connected to gas cylinders (air, nitrogen, propane, helium) and placed either in the lower port for inputs, or alternatively in a device in-line just after the flocculant input and before the mixing loop. See the schematic in FIG. 1.

The procedure of Example 5 was followed except that gases were introduced into a mixing bottle of polycarbonate placed in the flow. The mixing bottle was fitted with inputs for both the flocculant and a microbubbling airstone. Gas flow to the airstone was adjusted via a two-stage regulator at a tank. Gases tested were air, nitrogen, helium, and hydrocarbon (MAPP) gas, a commercial mixture of propane, butane, and methylacetylene propadiene. Gas flow was adjusted over the range of the minimum amount that generated a visible bubble stream and a maximum amount that produced a foamy appearance in the bottle and the outflow. The coagulant was added prior to the inputs of flocculant and gas. In some experiments, the flocculant was added just prior to the mixing bottle via a separate t-connector.

In all cases when the gases were introduced over the lower range of gas flow, gas-entrained flocs were produced that were very buoyant. This effect was seen as the treated stream entered the glass column, where the oily solids would quickly float to the top with essentially no neutrally buoyant or sinking solids. These floating oily solids were easily removed from the clarified water via skimming or overflow decanting at the upper port of the column.

If the gas flow was too high, the conditions of turbulence and mixing in the downstream mixing loop and input to the glass column were also too high, resulting in re-emulsification of some of the oily solids. In these cases, the fluids in the glass column were seen to be darker and cloudy with some small particulates as well as some flocs and oily solids that survived the treatment.

In control treatments for these simulations, gas was input from a port near the bottom of the column (see e.g. 15 in FIG. 1), so that gas was introduced after flocculation had taken place. In these cases, a microbubbling airstone, with inputs from the regulated gas tanks, was placed directly in the fluids at the bottom of the glass column. This allowed generation of a steady flow of microbubbles upward. The microbubbles interacted with the flocs and agglomerated solids as these entered the glass column at the midpoint port. However, the adhesion between the microbubbles, including the hydrocarbon gas bubbles, and the oily solids was not good. Thus, when the microbubbles were introduced from below after the flocs and oily solid agglomerations had already formed, some of the oily solids floated well, but others were either neutrally buoyant or they sank.

Example 7

5-Gallon Flow-Through Simulation of Clarification of SAGD Produced Water with Light Oil as a Flotation Aid and Removal of Oily Solids by Skimming and Decanting; No Air Entrainment Another option that worked well for flotation of the oily solids was to incorporate low-specific-gravity mineral oil into the fluid stream of the simulator. The procedure of example 5 was followed with the addition of another input, the mineral oil, via syringe pump. The level of mineral oil injected matched the levels previously evaluated in the vial and jar tests. The lower levels of mineral oil at 0.1 to 0.5 volume % of the total flow ranged in effectiveness from no effect to good effect. That is, at 0.1% volume % of the flow as the light oil, the oily solids appeared to float or not float in the glass column the same as observed in the control treatments with no oil or other flotation aid added. At 0.5 volume % of the total flow as light oil, flotation was quite good, with almost all of the oily solids floating in the glass column. At higher volume % light oil up to 1.0%, all of the oily solids floated well and were easily removed from the flow via skimming or overflow decanting through the upper port.

Example 8

250-Gallon Flow-Through Clarification of SAGD Produced Water with Simultaneous Flocculation and Air Entrainment as a Flotation Strategy Including Separation of the Oily Solids and Clarified Water by Skimming and Decanting Produced water from a SAGD operation in Canada was obtained in two 250-gallon totes. This water had an amber and oily appearance. The water was pretreated with 75 ppm of a polyEpi/DMA coagulant (FL 2749, SNF Inc.). An apparatus as shown in the schematic of FIG. 2 was used to flocculate the coagulated produced water in a flow-through simulation. The flocculant was added at 20 ppm actives via peristaltic pump from a stock of 14 mg per milliliter of a composition of an anionic PAM and an activated polysaccharide (AH 1100, Aquial LLC). Produced water was pumped through the simulator at 5 to 47 gallons per minute via a Moyno pump. Clarified produced water with flocs and agglomerated solids of oily solids were collected in other totes or other receiving vessels such as 30-gallon polyethylene barrels.

In control treatments using this approach, at first no flotation aids were added. In this case, the separate phases of oily solids and clarified water were easily observed in the receiver, with the oily solids partly floating, partly neutrally buoyant, and partly sinking.

Next, an eductor was placed in the fluid stream and arranged for simultaneous introduction of air and flocculant. In the preferred case, the air inflow was moderated to generate a continuous stream of small bubbles, without turbulent frothing, by opening the valve of the eductor only enough to permit visible air inflow. The ensuing flocculation process was observed to entrain air into the oily solids, which agglomerated in large, floating mats of very buoyant material at the top of the fluids in the receiving totes. Subsamples in bottles were taken for a photographic record. The oily solids were removed from these samples by filtration and the clarified water checked for residual O&G. The oily solids in the totes were easily separated from the clarified water by skimming and decanting.

FIG. 3 shows the schematic appearance (top row) and actual appearance (bottom row) of SAGD produced water in 0.4 liter bottles after treatments using the 250-gallon simulator, using procedures described in Example 8 and 9. The samples had been set on the lab bench for 5 minutes, allowing the turbulence to subside, and the oily solids to settle or float, depending on the treatment. In treatments A-D, the oily solids were retained in the sample. The treatments were as follows for each sample shown:

Control: no chemical additives, no entrained air.

Treatment A. Coagulant, no flocculant, no entrained air.

Treatment B. Coagulant, no flocculant, plus entrained air. The aqueous phase was significantly murkier and retained significantly more amber color than the Treatment A sample.

Treatment C. Coagulant plus flocculant, no entrained air.

Treatment D. Coagulant plus flocculant plus entrained air. Aqueous phase was clearer than Treatment C, and solids floated.

Treatment E. Coagulant plus flocculant plus entrained air. Oily solids were removed from the sample, leaving only the clarified water. The oily solids were removed via various approaches including filtration, screening, skimming, and decanting.

If the air was introduced into the treatment stream as above, with the produced water having been pretreated with coagulant, but without inclusion of the flocculant (Treatment B), some of the oily solids did float reasonably well. Most of the oily solids remained dispersed, however, and the water was still relatively dark and oily. If coagulant was not added, with only the simultaneous flocculant-plus-air treatment used, the oily solids did not flocculate well and the produced water remained relatively dark and oily (sample not shown).

If the produced water was pumped at a velocities up to 8 feet per second through hoses with either 1 inch or 2 inches inner diameters, the oily solids did not re-emulsify and the water remained nicely clarified. If the velocities in the stream of treated produced water became higher than about 10 feet per second, the oily solids did become re-emulsified in part. Similarly, if turbulence in the treated stream was increased too much via excessive introduction of air, the oily solids would start to re-emulsify. In these cases, the produced water remained partly dark and oily.

Example 9

250-Gallon Flow-Through Clarification of SAGD Produced Water with and without Simultaneous Flocculation and Air Entrainment as a Flotation Strategy Including Separation of the Oily Solids and Clarified Water by Screening In this set of simulations, again produced water from a SAGD operation in Canada was used. The procedure as described in Example 8 above was followed. However, an inclined-screen system at the pilot-scale was obtained (Engineering Fluid Solutions, LLC of Arvada, Colo.) and incorporated into the treatment stream. This system accommodated flows up to 30 to 50 gallons per minute as used herein. The system has removable screens of approximately 14 inches width and 24 inches length of various mesh sizes to allow selection of optimal pore size for a particular application. The screens are inclined at an adjustable angle, which was set in this work at 45 degrees, with the flow directed onto the screen from top. The screens are comprised of wedge-wire of stainless steel and are arranged for continuous screening and removal of solids from an aqueous stream of high-volume throughput at the commercial scale.

The oily solids were pushed down the screen by the incoming flow and tended to slide off the bottom of the screen into a collector. In addition, they were subjected to a cleansing cycle at automated intervals during which the flow was directed across the top of the screen, washing the accumulate solids into a collecting basket. In the experiments described herein, the solids washed off the screen adequately without use of the cleansing cycle, although use of the cycle was effective as well.

For the produced water examined and the coagulant-plus-flocculant treatment used, with or without entrained air, a screen with 200 micron pores performed the best. This permitted flows up to 25 gallons per minute without overflow of the screen. The clarified water, free of solids and oily residues, was collected in receiving vessels, either barrels or a tote. Screens with smaller pores were also effective in removing the solids, but the flow that could be accommodated without overflowing the screen needed to be lowered significantly. Use of screens with 300 micron pores was not successful in that some of the oily solids passed through and into the receiving vessel.

In a variation of the simulation, in some experiments, the flow was divided into two streams, a main stream provided via a double diaphragm pump delivering at a rate of 22 gallons per minute. The coagulated produced water was drawn from the bottom port of the tote via a transparent polymer hose of 2-inch inner diameter having an imbedded spiral, steel ribbon as reinforcement against collapse. The second stream was drawn using this same type of hose, placed in the top port of the tote, and driven via the Moyno® pump. This stream was used for inputs of flocculant and air. The two streams were combined via a t-connector just upstream of the inputs, with the flocculated and clarified water collected in barrels or another tote.

This variation was very effective, generating clarified water, free of oily residues, and having very buoyant oily solids with essentially no sinking or neutrally buoyant solid phases. This demonstrated that the flocculant and air could be added as a side stream, prior to mixing with the main flow, with success in clarifying the main flow such that there were a stable, floating layer of oily solids on top and fully clarified, oily solids-free water below.

The Examples below describe successful clarification of process waters from other industrial sources using the chemical treatments described herein. It is expected that the separation of phases would be further enhanced by incorporation of gaseous bubbles simultaneous with the flocculant, as described herein and demonstrated in the above Examples for clarification of produced water from oil-sands mining operations.

Example 10

Clarification of Produced Water from a Coffee Processing Operation

A sample of an aqueous waste stream from a coffee processing operation was obtained. The sample had a dark appearance and visible suspended particulates. Aliquots of 10 ml were treated according to the vial assay of Example 1. The subsamples in the vials were dosed at room temperature with 125-150 μg/ml of polyEpi/DMA (FL 2749). The vials were swirled manually and coagulation was allowed to occur for 30 seconds. Next, a starch/cationic PAM flocculant composition, CH1100 from Aquial LLC (see definitions of Materials above), was added at a dose of 70 μg/ml, and each vial was swirled manually for 15 seconds and placed on the lab bench. Flocculation was observed to occur over the next minute with a clarified water phase and a phase of agglomerated solids clearly separating.

Example 11

Clarification of Produced Water from an Automotive Manufacturing Plant

A sample of an aqueous waste stream from an automotive manufacturing plant was obtained. The sample contained a white, hazy solid phase. A subsample of 10 ml was treated according to the vial assay of Example 1. The subsample in the vial was dosed at room temperature with 5 μg/ml of polyEpi/DMA (FL 2749). The vial was swirled manually and coagulation was allowed to occur for 30 seconds. Next, a starch/anionic PAM flocculant composition, AH1100 (see definitions of Materials above), was added at a dose of 5 μg/ml, and the vial was swirled manually for 15 seconds and placed on the lab bench. Flocculation was observed to occur over the next minute with a clarified water phase and a phase of agglomerated solids clearly separating.

It is claimed:

1. A method of clarifying waste process water containing suspended and/or emulsified oils and/or oily solids, the method comprising:
   (a) adding a polycationic coagulant to the process water followed by an incubation period;
   (b) subsequent to the incubation period, adding a flocculant, comprising an acrylamide copolymer having a molecular weight of at least 4 million Daltons and a mole % of acrylamide of at least 50%, to the process water, and simultaneously introducing gaseous microbubbles into the process water,
   whereby, during subsequent formation and agglomeration of flocs of oil droplets and oily solid matter, the microbubbles become entrained within and adhere to the flocs; and
   c) separating a phase of flocculated oil and oily solid matter from a clarified aqueous phase;
   wherein the waste process water is produced-water from an oil sands mining operation.

2. The method of claim 1, wherein the pH of the process water is adjusted to about 2-4 prior to the addition of the coagulant.

3. The method of claim 1, wherein the incubation period is at least 30 seconds.

4. The method of claim 1, wherein the gaseous microbubbles are released from a pressurized solution of dissolved gas prior to said introducing.

5. The method of claim 1, wherein the acrylamide copolymer is selected from an acrylamide/acrylate copolymer, an acrylamide/allyl trialkyl ammonium copolymer, and an acrylamide/diallyl dialkyl ammonium copolymer.

6. The method of claim 5, wherein the flocculant further comprises a heat-activated or pregelatinized starch having flocculating activity.

7. The method of claim 1, wherein the coagulant is an epichlorohydrin-dimethylamine copolymer (polyEPl/DMA) or a polymer of diallyl dimethyl ammonium chloride (poly-DADMAC) and has a molecular weight less than 1 million Daltons.

8. The method of claim 1, wherein the total amount of additive, including coagulant and flocculant(s), is in the range of about 2 ppm to about 500 ppm relative to the process water.

9. The method of claim 1, further comprising addition of a flotation additive to the produced water.

10. The method of claim 9, wherein the flotation additive is added prior to addition of the coagulant.

11. The method of claim 1, wherein the acrylamide copolymer flocculant is an acrylamide/acrylate copolymer.

12. The method of claim 1, wherein the coagulant is an epichlorohydrin-dimethylamine copolymer (polyEPI/DMA).

13. The method of claim 1, wherein step (c) is carried out by gas flotation.

* * * * *